United States Patent
Li

(10) Patent No.: US 11,373,642 B2
(45) Date of Patent: Jun. 28, 2022

(54) VOICE INTERACTION METHOD, SYSTEM, TERMINAL DEVICE AND MEDIUM

(71) Applicant: BOE TECHNOLOGY GROUP CO., LTD., Beijing (CN)

(72) Inventor: Yingjie Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 145 days.

(21) Appl. No.: 16/818,145

(22) Filed: Mar. 13, 2020

(65) Prior Publication Data

US 2021/0065694 A1  Mar. 4, 2021

(30) Foreign Application Priority Data

Aug. 29, 2019  (CN) .......................... 201910808807.0

(51) Int. Cl.
*G10L 15/18* (2013.01)
*G06F 16/9032* (2019.01)
(Continued)

(52) U.S. Cl.
CPC ...... *G10L 15/1815* (2013.01); *G06F 16/3329* (2019.01); *G06F 16/3344* (2019.01);
(Continued)

(58) Field of Classification Search
CPC . G10L 15/1815; G10L 15/1822; G10L 15/22; G10L 2015/223; G06F 16/3329;
(Continued)

(56) References Cited

U.S. PATENT DOCUMENTS 4,430,845 A * 2/1984 Dohrendorf ............ B65B 9/067
493/302
5,668,958 A * 9/1997 Bendert .................. G06F 16/10
710/305
(Continued)

FOREIGN PATENT DOCUMENTS

CN  105206275 A  12/2015
CN  106897263 A  6/2017
(Continued)

*Primary Examiner* — Eric Yen
(74) *Attorney, Agent, or Firm* — The Webb Law Firm

(57) ABSTRACT

The present disclosure discloses a voice interaction method, system, terminal device and medium. The method comprises the following operations performed by a terminal device: performing voice recognition on collected voice signals to acquire an input sentence; semantically matching the input sentence with cached sample sentences to determine whether there is a sample sentence having the same or similar semantics as the input sentence among the cached sample sentences; if yes, acquiring cached response content corresponding to the sample sentence having the same or similar semantics as the input sentence as response content of the input sentence; if not, sending the input sentence to a server; receiving from the server response content acquired by the server through semantic understanding according to a knowledge base stored on the server; and responding to the input sentence according to the response content.

17 Claims, 4 Drawing Sheets

(51) Int. Cl.
  *G10L 15/22* (2006.01)
  *G06F 16/332* (2019.01)
  *G06F 40/30* (2020.01)
  *G06F 16/33* (2019.01)
(52) U.S. Cl.
  CPC ........ *G06F 16/90332* (2019.01); *G06F 40/30* (2020.01); *G10L 15/1822* (2013.01); *G10L 15/22* (2013.01); *G10L 2015/223* (2013.01)
(58) Field of Classification Search
  CPC ........... G06F 16/3344; G06F 16/90332; G06F 40/205; G06F 40/268; G06F 40/284; G06F 40/30
  See application file for complete search history.

(56) References Cited

U.S. PATENT DOCUMENTS

| | | | | |
|---|---|---|---|---|
| 6,377,944 | B1* | 4/2002 | Busey | H04L 29/06 |
| 7,315,826 | B1* | 1/2008 | Guheen | G06Q 10/06 |
| | | | | 705/7.29 |
| 9,990,176 | B1* | 6/2018 | Gray | G06F 3/165 |
| 10,558,633 | B1* | 2/2020 | Kim | G06F 16/2255 |
| 10,713,289 | B1* | 7/2020 | Mishra | G06F 40/30 |
| 2002/0023144 | A1* | 2/2002 | Linyard | G06F 16/954 |
| | | | | 709/218 |
| 2002/0046291 | A1* | 4/2002 | O'Callaghan | H04L 45/7453 |
| | | | | 709/238 |
| 2002/0198883 | A1* | 12/2002 | Nishizawa | G06F 16/9574 |
| 2003/0046434 | A1* | 3/2003 | Flanagin | H04L 67/1095 |
| | | | | 709/248 |
| 2004/0044516 | A1* | 3/2004 | Kennewick | G10L 15/22 |
| | | | | 704/5 |
| 2004/0230897 | A1* | 11/2004 | Latzel | G06F 16/958 |
| | | | | 715/234 |
| 2005/0240413 | A1* | 10/2005 | Asano | G06F 40/30 |
| | | | | 704/270 |
| 2006/0020473 | A1* | 1/2006 | Hiroe | G10L 13/027 |
| | | | | 704/275 |
| 2009/0138477 | A1* | 5/2009 | Piira | G06F 16/40 |
| 2009/0327234 | A1* | 12/2009 | Coladonato | G06F 16/3323 |
| 2010/0057723 | A1* | 3/2010 | Rajaram | G06F 16/951 |
| | | | | 707/E17.032 |
| 2012/0015642 | A1* | 1/2012 | Seo | H04W 8/245 |
| | | | | 455/419 |
| 2012/0303358 | A1* | 11/2012 | Ducatel | G06F 16/30 |
| | | | | 704/9 |
| 2015/0161996 | A1* | 6/2015 | Petrov | G06F 40/289 |
| | | | | 704/257 |
| 2016/0196258 | A1* | 7/2016 | Ma | G06F 40/30 |
| | | | | 704/8 |
| 2016/0294970 | A1* | 10/2016 | Robinson | G06F 16/29 |
| 2017/0295236 | A1* | 10/2017 | Kulkarni | H04L 67/1097 |
| 2018/0166077 | A1* | 6/2018 | Yamaguchi | G10L 15/22 |
| 2018/0190292 | A1 | 7/2018 | Xu | |
| 2018/0285348 | A1* | 10/2018 | Shu | G06F 40/35 |
| 2018/0285928 | A1* | 10/2018 | Kirmani | G06Q 30/0601 |
| 2019/0103102 | A1* | 4/2019 | Tseretopoulos | H04L 51/02 |
| 2019/0114082 | A1* | 4/2019 | Pan | G06F 3/065 |
| 2019/0163735 | A1* | 5/2019 | Xu | G06N 3/084 |
| 2019/0180756 | A1* | 6/2019 | Yang | G10L 15/22 |
| 2019/0354630 | A1* | 11/2019 | Guo | G10L 15/22 |
| 2019/0370273 | A1* | 12/2019 | Frison | G06F 16/3347 |

FOREIGN PATENT DOCUMENTS

| | | |
|---|---|---|
| CN | 107102982 A | 8/2017 |
| CN | 108932342 A | 12/2018 |
| CN | 109102809 A | 12/2018 |
| CN | 109147788 A | 1/2019 |

* cited by examiner

2000

S21: performing, by the terminal device, word segmentation on the input sentence and each sample sentence cached by the terminal device, respectively S22: acquiring, by the terminal device, a word vector of one or more words in the input sentence according to a word segmentation result for the input sentence and a plurality of word vectors cached by the terminal device, and acquiring, by the terminal device, a word vector of one or more words in each sample sentence according to a word segmentation result for each sample sentence and the plurality of word vectors cached by the terminal device.

S23: generating, by the terminal device, a sentence vector of the input sentence according to the word vector of the one or more words in the input sentence, and generating, by the terminal device, a sentence vector of each sample sentence according to the word vector of the one or more words in each sample sentence;

S24: performing, by the terminal device, a similarity calculation on the input sentence and each sample sentence according to the sentence vector of the input sentence and the sentence vector of each sample sentence;

S25: determining whether there is a sample sentence having the same or similar semantics as the input sentence among the cached sample sentences based on a result of the similarity calculation.

FIG. 2

VOICE INTERACTION METHOD, SYSTEM, TERMINAL DEVICE AND MEDIUM

CROSS-REFERENCE TO RELATED APPLICATION

This application claims priority to Chinese Patent Application No. 201910808807.0 filed Aug. 29, 2019, the disclosure of which is hereby incorporated by reference in its entirety.

BACKGROUND OF THE INVENTION

The present disclosure relates to the technical field of voice interaction, and in particular relates to a voice interaction method, system, terminal device and medium.

FIELD OF THE INVENTION

At present, intelligent devices with a voice interaction function applicable to home control, vehicle-mounted device interaction, personal entertainment and the like are gradually popularized.

SUMMARY OF THE INVENTION

According to a first aspect of the present disclosure, there is provided a method performed by a terminal device, comprising: performing voice recognition on collected voice signals to acquire an input sentence; semantically matching the input sentence with cached sample sentences to determine whether there is a sample sentence having the same or similar semantics as the input sentence among the cached sample sentences; in response to determining that there is a sample sentence having the same or similar semantics as the input sentence among the cached sample sentences, acquiring cached response content corresponding to the sample sentence having the same or similar semantics as the input sentence as response content of the input sentence; in response to determining that there is no sample sentence having the same or similar semantics as the input sentence among the cached sample sentences, sending the input sentence to a server; receiving response content of the input sentence from the server, wherein the response content of the input sentence is acquired by the server through semantic understanding of the input sentence according to a knowledge base stored on the server; and responding to the input sentence according to the response content of the input sentence.

In some embodiments, the method further comprises: updating the cached sample sentences and response content of the cached sample sentences according to the input sentence and the response content of the input sentence.

In some embodiments, the updating the cached sample sentences and the response content of the cached sample sentences according to the input sentence and the response content of the input sentence further comprises: determining an acquisition frequency of the input sentence, comparing the acquisition frequency of the input sentence to a first preset threshold, and in response to determining that the acquisition frequency of the input sentence is greater than the first preset threshold, updating the cached sample sentences and the response content of the cached sample sentences according to the input sentence and the response content of the input sentence.

In some embodiments, the updating the cached sample sentences and the response content of the cached sample sentences according to the input sentence and the response content of the input sentence in response to determining that the acquisition frequency of the input sentence is greater than the first preset threshold further comprises: comparing a cache capacity of the terminal device to a second preset threshold; in response to that the cache capacity of the terminal device is less than the second preset threshold, comparing the acquisition frequency of the input sentence to an acquisition frequency of a cached sample sentence with the minimum acquisition frequency; and in response to determining that the acquisition frequency of the input sentence is greater than the acquisition frequency of the cached sample sentence with the minimum acquisition frequency, updating the cached sample sentences and the response content thereof by using the input sentence and the response content thereof to replace the cached sample sentence with the minimum acquisition frequency.

In some embodiments, the semantically matching the input sentence with cached sample sentences to determine whether there is a sample sentence having the same or similar semantics as the input sentence among the cached sample sentences further comprises: performing word segmentation on the input sentence and each of the cached sample sentence, respectively; acquiring a word vector of one or more words in the input sentence according to a word segmentation result for the input sentence and cached word vectors, and acquiring a word vector of one or more words in each sample sentence according to a word segmentation result for each sample sentence and the cached word vectors; generating a sentence vector of the input sentence according to the word vector of the one or more words in the input sentence, and generating a sentence vector of each sample sentence according to the word vector of the one or more words in each sample sentence; performing a similarity calculation on the input sentence and each sample sentence according to the sentence vector of the input sentence and the sentence vector of each sample sentence; and determining whether there is a sample sentence having the same or similar semantics as the input sentence among the cached sample sentences based on a result of the similarity calculation.

In some embodiments, the generating a sentence vector of each sample sentence according to the word vector of the one or more words in each sample sentence further comprises: encoding the word vector of the one or more words in the input sentence and encoding the word vector of the one or more words in each sample sentence using a neural network, so as to generate the sentence vector of the input sentence and the sentence vector of each sample sentence.

In some embodiments, the response content of the input sentence further comprises at least one of a control instruction or voice response content. The responding to the input sentence according to the response content of the input sentence includes at least one of: performing a corresponding action according to the control instruction or carrying out a voice broadcast on the voice response content.

In some embodiments, the method further comprises: sending an update request message carrying cache capacity information of the terminal device itself to the server, receiving cache update data from the server, wherein the cache update data is generated by the server at least according to the cache capacity information of the terminal device itself carried by the update request message and acquisition frequencies of respective sample sentences in the knowledge base, and updating the cached sample sentences and the response content of the cached sample sentences according to the cache update data.

According to another aspect of the present disclosure, there is provided a terminal device, comprising: a memory storing computer instructions thereon and a processor coupled to the memory. When the processor executes the computer instructions, the processor is configured to: perform voice recognition on collected voice signals to acquire an input sentence; semantically match the input sentence with cached sample sentences to determine whether there is a sample sentence having the same or similar semantics as the input sentence among the cached sample sentences; in response to determining that there is a sample sentence having the same or similar semantics as the input sentence among the cached sample sentences, acquire cached response content corresponding to the sample sentence having the same or similar semantics as the input sentence as response content of the input sentence; in response to determining that there is no sample sentence having the same or similar semantics as the input sentence among the cached sample sentences, send the input sentence to a server; receive response content of the input sentence from the server, wherein the response content of the input sentence is acquired by the server through semantic understanding of the input sentence according to a knowledge base stored on the server; and respond to the input sentence according to the response content acquired.

In some embodiments, when the processor executes the computer instructions, the processor is further configured to: update the cached sample sentences and response content of the cached sample sentences according to the input sentence and the response content of the input sentence.

In some embodiments, when the processor executes the computer instructions, the processor is further configured to update the cached sample sentences and the response content of the cached sample sentences according to the input sentence and the response content of the input sentence by performing the following operations: determining an acquisition frequency of the input sentence, comparing the acquisition frequency of the input sentence to a first preset threshold, and in response to determining that the acquisition frequency of the input sentence is greater than the first preset threshold, updating the cached sample sentences and the response content of the cached sample sentences according to the input sentence and the response content of the input sentence.

In some embodiments, when the processor executes the computer instructions, the processor is further configured to update the cached sample sentences and the response content of the cached sample sentences according to the input sentence and the response content of the input sentence in response to determining that the acquisition frequency of the input sentence is greater than the first preset threshold by performing the following operations: comparing a cache capacity of the terminal device to a second preset threshold; in response to that the cache capacity of the terminal device is less than the second preset threshold, comparing the acquisition frequency of the input sentence to an acquisition frequency of a cached sample sentence with the minimum acquisition frequency; and in response to determining that the acquisition frequency of the input sentence is greater than the acquisition frequency of the cached sample sentence with the minimum acquisition frequency, updating the cached sample sentences and the response content thereof by using the input sentence and the response content thereof to replace the cached sample sentence with the minimum acquisition frequency.

In some embodiments, when the processor executes the computer instructions, the processor is further configured to semantically match the input sentence with cached sample sentences to determine whether there is a sample sentence having the same or similar semantics as the input sentence among the cached sample sentences by performing the following operations: performing word segmentation on the input sentence and each sample sentence of the cached sample sentences, respectively; acquiring a word vector of one or more words in the input sentence according to a word segmentation result for the input sentence and cached word vectors, and acquiring a word vector of one or more words in each sample sentence according to a word segmentation result for each sample sentence and the cached word vectors; generating a sentence vector of the input sentence according to the word vector of the one or more words in the input sentence, and generating a sentence vector of each sample sentence according to the word vector of the one or more words in each sample sentence; performing a similarity calculation on the input sentence and each sample sentence according to the sentence vector of the input sentence and the sentence vector of each sample sentence; and determining whether there is a sample sentence having the same or similar semantics as the input sentence among the cached sample sentences based on a result of the similarity calculation.

In some embodiments, when the processor executes the computer instructions, the processor is further configured to generate a sentence vector of the input sentence according to the word vector of the one or more words in the input sentence and generate a sentence vector of each sample sentence according to the word vector of the one or more words in each sample sentence by performing the following operations: encoding the word vector of the one or more words in the input sentence and encoding the word vector of the one or more words in each sample sentence using a neural network, so as to generate the sentence vector of the input sentence and the sentence vector of each sample sentence.

In some embodiments, the response content of the input sentence further comprises at least one of a control instruction or voice response content. The processor is further configured to respond to the input sentence according to the response content of the input sentence by at least one of: performing a corresponding action according to the control instruction or carrying out a voice broadcast on the voice response content.

In some embodiments, when the processor executes the computer instructions, the processor is further configured to: send an update request message carrying cache capacity information of the terminal device itself to the server, receive cache update data from the server, wherein the cache update data is generated by the server at least according to the cache capacity information of the terminal device itself carried by the update request message and acquisition frequencies of respective sample sentences in the knowledge base, and update the cached sample sentences and the response content of the cached sample sentences according to the cache update data.

According to another aspect of the present disclosure, there is provided a voice interaction system, which comprises a terminal device and a server. The terminal device is configured to: perform voice recognition on collected voice signals to acquire an input sentence; semantically match the input sentence with cached sample sentences to determine whether there is a sample sentence having the same or similar semantics as the input sentence among the cached sample sentences; in response to determining that there is a sample sentence having the same or similar semantics as the input sentence among the cached sample sentences, acquire cached response content corresponding to the sample sentence having the same or similar semantics as the input sentence; in response to determining that there is no sample sentence having the same or similar semantics as the input sentence among the cached sample sentences, send the input sentence to the server, receive response content of the input sentence from the server, and respond to the input sentence according to the response content of the input sentence. The server is configured to: receive the input sentence from the terminal service, perform semantic understanding of the input sentence according to a knowledge base stored on the server to acquire the response content of the input sentence, and send the response content of the input sentence to the terminal device.

In some embodiments, the server is further configured to: update the knowledge base according to the received input sentence and the acquired response content of the input sentence.

In some embodiments, the terminal device is further configured to: send an update request message carrying cache capacity information of the terminal device itself to the server, receive cache update data from the server, and update the cached sample sentences and the response content of the cached sample sentences according to the cache update data.

In some embodiments, the server is further configured to: receive an update request message from the terminal device, generate the cache update data at least according to cache capacity information of the terminal device itself carried by the update request message and acquisition frequencies of respective sample sentences in the knowledge base, and send the cache update data to the terminal device.

According to another aspect of the present disclosure, there is provided a non-transitory computer-readable storage medium having stored thereon a computer program, wherein the program, when executed by a processor, implements the method as described above.

BRIEF DESCRIPTION OF THE DRAWINGS

The embodiments of the present disclosure will be further described in details below with reference to the drawings.

FIG. 2 is a flowchart illustrating a semantic matching method provided in an embodiment of the present disclosure.

DESCRIPTION OF THE INVENTION

Figure 1:
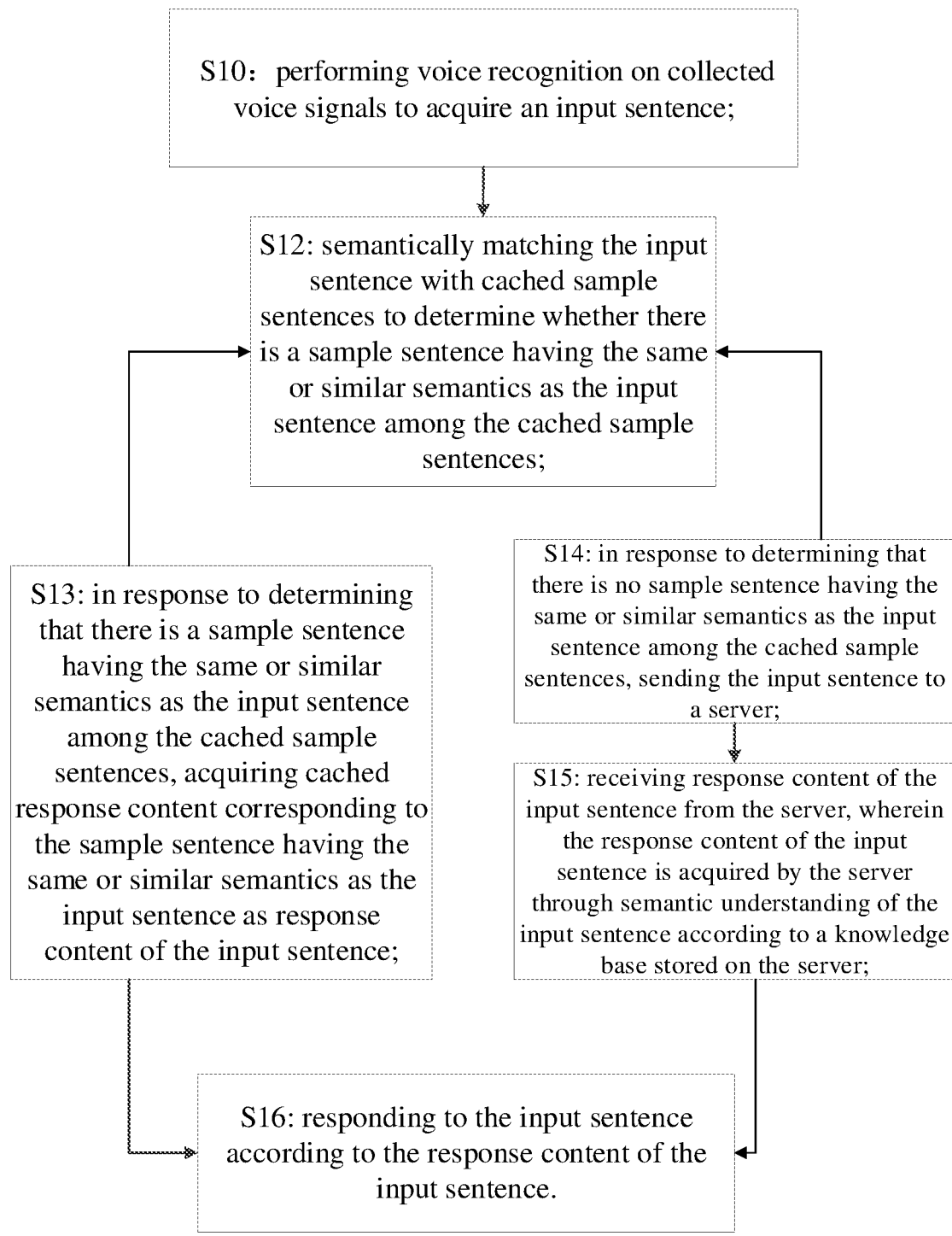
FIG. 1 is a flowchart illustrating a voice interaction method provided in an embodiment of the present disclosure.

In order to illustrate the present disclosure in a clearer manner, the present disclosure is further illustrated below with reference to the preferred embodiments and drawings. Similar components in the drawings are represented by the same reference sign. It shall be understood by those skilled in the art that the contents specifically described below are illustrative instead of limiting, and the scope of protection sought for in the present disclosure shall not be limited thereby.

FIG. 1 is a flowchart illustrating a voice interaction method 1000 provided in an embodiment of the present disclosure. The method 1000 is performed by a terminal device (e.g., a terminal device 100 in FIG. 3).

As shown in FIG. 1, an embodiment of the present disclosure provides a voice interaction method, comprising the following steps:

S10: performing voice recognition on collected voice signals to acquire an input sentence;

S12: semantically matching the input sentence with cached sample sentences to determine whether there is a sample sentence having the same or similar semantics as the input sentence among the cached sample sentences;

S13: in response to determining that there is a sample sentence having the same or similar semantics as the input sentence among the cached sample sentences, acquiring cached response content corresponding to the sample sentence having the same or similar semantics as the input sentence as response content of the input sentence;

S14: in response to determining that there is no sample sentence having the same or similar semantics as the input sentence among the cached sample sentences, sending the input sentence to a server;

S15: receiving response content of the input sentence from the server, wherein the response content of the input sentence is acquired by the server through semantic understanding of the input sentence according to a knowledge base stored on the server; and S16: responding to the input sentence according to the response content of the input sentence.

The voice interaction method provided in the present embodiment can dramatically reduce the processing pressure of the server, reduce the cost of the server and improve the response speed of voice interaction without excessively increasing the requirements for the processing performance and the storage space of the terminal device, and is particularly suitable for situations where a server or a server cluster consisting of a limited number of servers provides voice interaction service for a large number of terminal devices at the same time. In addition, the cache mechanism of the sample sentences and the response content thereof adopted by the terminal device is easy to manage and can be flexibly configured.

In addition, compared with the solution provided in the present embodiment, on one hand, if the knowledge base including sample sentences and the response content thereof and various related information is completely delivered to the terminal device and the terminal device executes the semantic understanding algorithm, although the processing pressure of the server can be reduced and the cost of the server can be reduced, the requirements for the storage space and processing performance of the terminal device are higher, and moreover, the response speed of voice interaction cannot be effectively improved; on the other hand, if semantic matching is only performed on the terminal device, and if the sample sentence with the highest similarity is used as a similar sample sentence even in the case where there is no same or similar sample sentence, and the response content of the input sentence is acquired according to the sample sentence with the highest similarity, it is difficult to ensure the accuracy of voice interaction.

In summary, in the voice interaction method provided in the present embodiment, the terminal device caches a plurality of sample sentences and the response content thereof (rather than a knowledge base) occupying less storage space; after the input sentence is acquired through voice recognition, semantic matching, which is simple and fast relative to voice understanding, is performed locally on the terminal device to accurately acquire the response content, and if the semantic matching is unsuccessful, the input sentence is sent to the server for voice understanding to accurately acquire the response content. The method is a solution for realizing voice interaction through terminal-cloud cooperation, can give consideration to the aspects of accuracy, efficiency (response speed), implementation cost and the like of voice interaction, and has obvious advantages compared with existing voice interaction solutions.

In some optional implementation manners of the present embodiment, the response content further includes at least one of a control instruction or voice response content.

Step S16: further comprising at least one of the following: performing, by the terminal device, a corresponding action according to the control instruction, or carrying out, by the terminal device, a voice broadcast on the voice response content.

In some optional implementation manners of the present embodiment, the server is a cloud server.

FIG. 2 is a flowchart illustrating a semantic matching method 2000 provided in an embodiment of the present disclosure.

In some optional implementation manners of the present embodiment, as shown in FIG. 2, the method 2000 comprises:

S21: performing, by the terminal device, word segmentation on the input sentence and each sample sentence cached by the terminal device, respectively;

S22: acquiring, by the terminal device, a word vector of one or more words in the input sentence according to a word segmentation result for the input sentence and a plurality of word vectors cached by the terminal device, and acquiring, by the terminal device, a word vector of one or more words in each sample sentence according to a word segmentation result for each sample sentence and the plurality of word vectors cached by the terminal device.

S23: generating, by the terminal device, a sentence vector of the input sentence according to the word vector of the one or more words in the input sentence, and generating, by the terminal device, a sentence vector of each sample sentence according to the word vector of the one or more words in each sample sentence;

S24: performing, by the terminal device, a similarity calculation on the input sentence and each sample sentence according to the sentence vector of the input sentence and the sentence vector of each sample sentence; and S25: determining whether there is a sample sentence having the same or similar semantics as the input sentence among the cached sample sentences based on a result of the similarity calculation.

By adopting this implementation manner, through the plurality of word vectors cached in the terminal device, it is possible to reduce calculation resources consumed in the semantic matching process, save the processing capability of the terminal device, and improve the semantic matching speed, without excessively occupying the storage space of the terminal device.

In some optional implementation manners of the present embodiment, the generating, by the terminal device, the sentence vector of the input sentence according to the word vector of the one or more words in the input sentence, and generating, by the terminal device, the sentence vector of the sample sentence according to the word vector of the one or more words in each sample sentence further comprises: encoding, by the terminal device, the word vector of the one or more words in the input sentence and encoding, by the terminal device, the word vector of the one or more words in each sample sentence using a neural network, so as to generate the sentence vector of the input sentence and the sentence vector of each sample sentence.

By adopting this optional manner, the accuracy of the generated sentence vector of the input sentence and the generated sentence vector of the sample sentence can be improved without excessively increasing the requirements for the processing performance of the terminal device, so that the precision of semantic matching is improved.

In one specific example, the terminal device caches a plurality of word vectors. For example, the plurality of word vectors cached by the terminal device are cached as follows: the server extracts word vectors of some frequently used words to generate word vector data after performing word vector model training, and then sends at least part of the word vector data to the terminal device for caching according to the cache capacity of the terminal device itself. When the terminal device finds that a word vector of a certain word in the input sentence does not exist in the cache, it can send a word vector acquisition request carrying information of the word to the server, so that the server sends the word vector of the word to the terminal device, and the terminal device updates the cached word vectors according to the received word vector of the word.

When the terminal device respectively performs word segmentation on the input sentence and the sample sentences cached by the terminal device, the word segmentation can be realized by using various existing word segmentation tools, and the word segmentation can also be realized by a word segmentation program programmed based on existing word segmentation algorithms.

When the terminal device generates the sentence vector of the input sentence according to the word vector(s) of the one or more words in the input sentence and generates the sentence vector of the sample sentence according to the word vector of the one or more words in the sample sentence, a deep learning method is used for conversion. In the method, a simple neural network is used to encode a word vector sequence into a sentence vector. It needs to be noted that the model corresponding to the encoding performed using the neural network should be substantially consistent with the semantic understanding model generated by the server by training, so as to ensure the consistency and accuracy of response content acquisition. In addition, for a terminal device with low processing performance such as a low-end electronic product, the sentence vector can also be generated by using a simple method of word vector addition; this method requires low processing performance for processing and has a high processing speed, and in cooperation with setting a higher similarity threshold when performing a similarity calculation, the accuracy of the similarity calculation can also be ensured.

When the terminal device performs a similarity calculation on the input sentence and the sample sentence according to the sentence vector of the input sentence and the sentence vector of the sample sentence, the similarity calculation can be performed by using a calculation method based on cosine distance, Euclidean distance, Mahalanobis distance and the like. Taking the cosine distance as an example, the specific formula for calculating a distance between a vector A of the input sentence and a vector B of the sample sentence is as follows:

$$\cos\theta = \frac{\sum_{i=1}^{n}(A_i \times B_i)}{\sqrt{\sum_{i=1}^{n}(A_i)^2} \times \sqrt{\sum_{i=1}^{n}(B_i)^2}}$$

wherein, the value range of similarity value is between 0 and 1, and a similarity threshold can be set. If the similarity value between the input sentence and a certain sample sentence is greater than the similarity threshold, the two sentences are considered to be at least similar (namely same or similar), and then it can be determined that there is a sample sentence having the same or similar semantics as the input sentence among the cached sample sentences according to the matching result, so that the response content corresponding to the input sentence can be directly acquired from the cache of the terminal device. If there is no sample sentence a similarity value between which and the input sentence is greater than the similarity threshold, the input sentence is sent to the server for semantic understanding.

In some optional implementation manners of the present embodiment, the method further includes: updating, by the server, the knowledge base according to the received input sentence and the acquired response content of the input sentence.

By adopting this implementation manner, the server can update the knowledge base according to the received input sentence, which is advantageous for the expansion of the content of the knowledge base and the improvement of the response speed of subsequent voice interactions.

In the present embodiment, the manner of updating the sample sentences and the response content thereof cached by the terminal device may be local update or remote update, and the two update manners of local update and remote update can be used simultaneously, wherein the two update manners of local update and remote update are specifically as follows:

Local Update

In some optional implementation manners of the present embodiment, the method further includes: updating, by the terminal device, the cached sample sentences and the response content of the cached sample sentences according to the input sentence and the response content of the input sentence, that is, the input sentence used as a sample sentence and the response content of the input sentence are added to the cache content.

By adopting this implementation manner, the local update of the cache content performed by the terminal device according to the input sentence can be realized, which is beneficial to improve the response speed of subsequent voice interactions in a targeted manner.

In a specific example, if the response content is voice response content and the voice response content is acquired from the server, the terminal device caches the input sentence and its voice response content (audio files in formats of mp3, way, and the like), while carrying out a voice broadcast of the voice response content.

In some optional implementation manners of the present embodiment, the updating the cached sample sentences and the response content thereof by the terminal device according to the input sentence and the response content thereof further comprises: determining, by the terminal device, an acquisition frequency of the input sentence, and updating, by the terminal device, the cached sample sentences and the response content thereof using the input sentence with the acquisition frequency greater than a first preset threshold (such as a frequency threshold) and the response content thereof. The first preset threshold may be any natural number representing an acquisition frequency set according to needs, for example, the first preset threshold may be 5 times.

For example, the updating the cached sample sentences and the response content thereof according to the input sentence and the response content thereof further comprises: determining an acquisition frequency of the input sentence, comparing the acquisition frequency of the input sentence to the first preset threshold, and in response to determining that the acquisition frequency of the input sentence is greater than the first preset threshold, updating the cached sample sentences and the response content thereof using the input sentence and the response content thereof.

Wherein, the acquisition frequency of the input sentence is equal to a collection frequency of voice signals corresponding to the input sentence, which can reflect the popularity of the input sentence, and the terminal device can acquire frequently used sentences by counting and sorting acquisition frequencies of input sentences.

By adopting this implementation manner, it is possible to realize the local update of the cache content by the terminal device according to input sentences with high acquisition frequencies, which is more beneficial to improve the response speed of subsequent voice interactions in a targeted manner.

Further, in some optional implementation manners of the present embodiment, the updating the cached sample sentences and the response content thereof by the terminal device according to the input sentence with the acquisition frequency greater than the first preset threshold and the response content thereof further comprises: determining a cache capacity by the terminal device; if the cache capacity is less than a second preset threshold (for example, a cache capacity threshold), updating, by the terminal device, the cached sample sentences and the response content thereof according to a result of comparison between the acquisition frequency of the input sentence with the acquisition frequency greater than the first preset threshold and an acquisition frequency of a cached sample sentence with the minimum acquisition frequency.

For example, the updating the cached sample sentences and the response content thereof with the input sentence and the response content thereof in response to determining that the acquisition frequency of the input sentence is greater than the first preset threshold may comprise: comparing the cache capacity of the terminal device to the second preset threshold; in response to that the cache capacity of the terminal device is less than the second preset threshold, comparing the acquisition frequency of the input sentence to the acquisition frequency of the cached sample sentence with the minimum acquisition frequency; and in response to determining that the acquisition frequency of the input sentence is greater than the acquisition frequency of the cached sample sentence with the minimum acquisition frequency, updating the cached sample sentences and the response content thereof by using the input sentence and the response content thereof to replace the cached sample sentence with the minimum acquisition frequency. The second preset threshold may be any value representing a cache capacity set according to needs, for example, 10M bytes.

Wherein, the terminal device can also cache records of the acquisition frequencies of the input sentence and the sample sentences, and the acquisition frequencies of the input sentence and the sample sentences can be acquired based on the records when comparing the acquisition frequency of the input sentence to that of the sample sentences.

By adopting this implementation manner, it can be ensured that the cache capacity occupied by the cached sample sentences and the response content thereof is managed and controlled, and it can be ensured that the implementation of voice interaction does not occupy excessive storage space of the terminal device.

In a specific example, for example, it is supposed that when the cache capacity is less than the second preset threshold, the number of entries of the cached sample sentences and the response content thereof to be updated needs to be kept unchanged, that is, the cache capacity of the terminal device occupied by the cached sample sentences and the response content thereof to be updated cannot be increased any more in this case. It is determined whether the acquisition frequency of the input sentence is greater than the acquisition frequency of the cached sample sentence with the minimum acquisition frequency: if yes, the cached sample sentence with the minimum acquisition frequency and the response content thereof (also including the record of the acquisition frequency) are deleted, and the input sentence and the response content thereof (also including the record of the acquisition frequency) are added to the cache, so as to realize updating the cache and keeping the number of entries of the cached sample sentences and the response content thereof unchanged; if not, the cache is not updated.

Remote Update

In some optional implementation manners of the present embodiment, the method further comprises:

sending, by the terminal devices, update request messages carrying cache capacity information of the terminal devices themselves to the server, wherein the terminal devices may periodically send the update request messages, may send the update request messages in response to user operations, or may send the update request messages when specific events occur, where the specific event refers to, for example, the start-up of a terminal device, etc.;

generating, by the server, cache update data according to cache capacity information of the terminal devices themselves carried by the update request messages and acquisition frequencies of respective sample sentences in the knowledge base, and sending, by the server, the cache update data to corresponding terminal devices, wherein: the server stores received input sentences as sample sentences in the knowledge base, so the acquisition frequencies of the sample sentences are equal to the acquisition frequencies of the input sentences received by the server and can reflect the popularity thereof; the server may acquire frequently used sentences by counting and sorting the receiving frequencies of the received input sentences, and the server can calculate the receiving frequencies of the input sentences according to input sentence records sent by each terminal device or input sentence records sent by a group of terminal devices (e.g. terminal devices of the same type);

updating, by the terminal devices, the cached sample sentences and the response content thereof according to the cache update data.

By adopting this implementation manner, it is possible to realize the remote update of the cache content of the terminal devices by the server, which facilitates the server to synthesize input sentences acquired by a plurality of terminals to update the cache content of the terminal devices, and can improve the response speed of subsequent voice interactions.

In addition to the above implementation manners, in some optional implementation manners of the present embodiment, the method further comprises:

sending, by the server, an update inquiry message to the terminal devices, wherein the server may periodically send the update inquiry message, or may send the update inquiry message when detecting a specific event, where the specific event refers to, for example, the start-up of a certain terminal device (when a terminal device is shut down, it is disconnected from the server, and when the terminal device re-establishes a connection with the server, the server determines that it is started up);

sending, by the terminal devices, update confirmation messages carrying cache capacity information of the terminal devices themselves to the server, wherein the terminal devices may present the update inquiry message after receiving the update inquiry messages, and send the update confirmation messages carrying the cache capacity information of the terminal devices themselves to the server in response to user confirmation operations.

generating, by the server, cache update data according to the cache capacity information of the terminal devices themselves carried by the update confirmation messages and acquisition frequencies of respective sample sentences in the knowledge base, and sending, by the server, the cache update data to corresponding terminal devices; and updating, by the terminal devices, the cached sample sentences and the response content thereof according to the cache update data.

Figure 3:
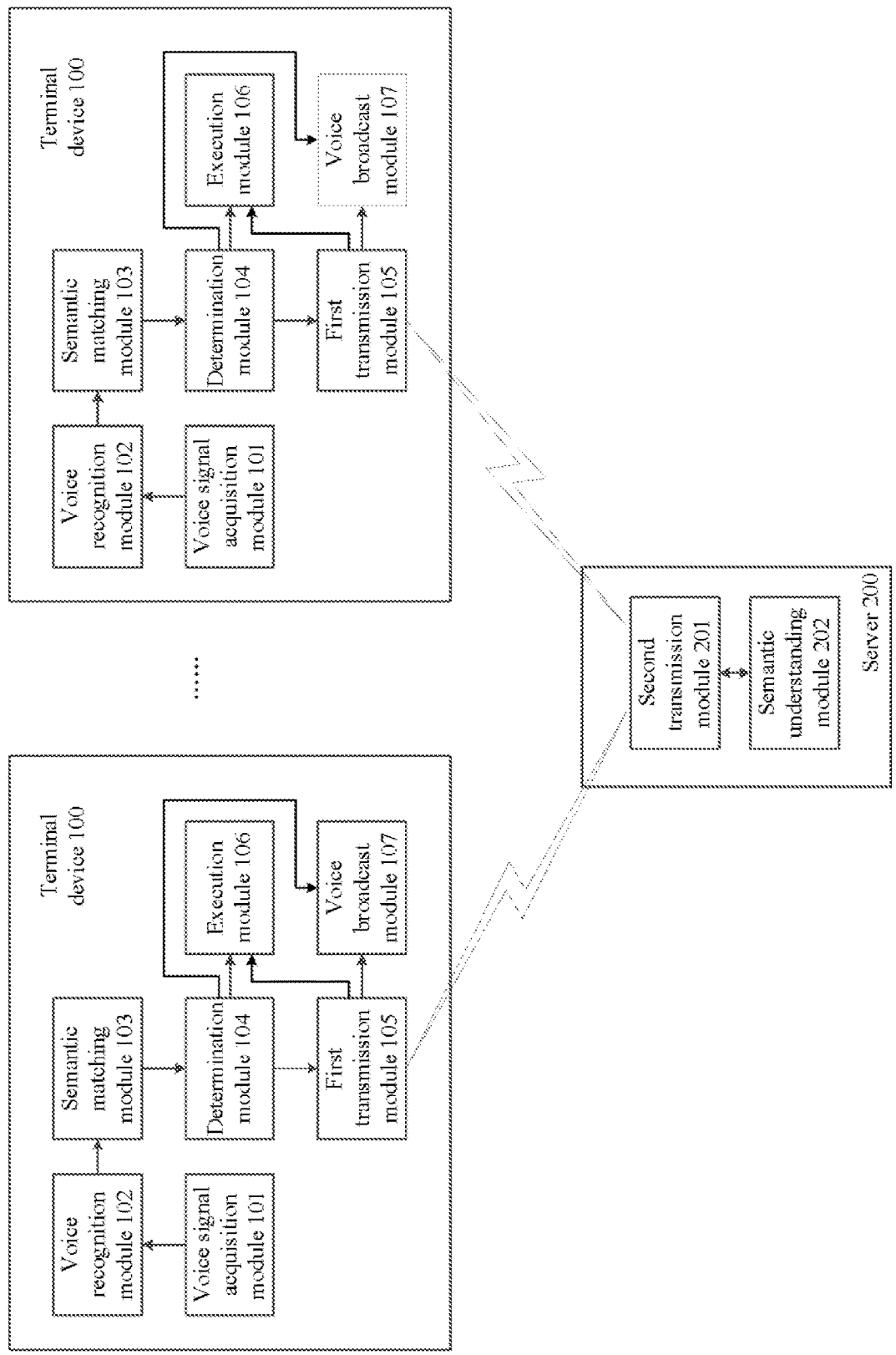
FIG. 3 is a schematic diagram illustrating a voice interaction system provided in an embodiment of the present disclosure.

FIG. 3 is a schematic diagram illustrating a voice interaction system provided in an embodiment of the present disclosure.

As shown in FIG. 3, the voice interaction system comprises a server 200 and at least one terminal device 100.

The server 200 and the at least one terminal device 100 may each comprise one or more modules. These modules may be implemented in hardware, software, firmware, or any combination thereof. One or more of these modules may be integrated together, and some of these modules may include smaller modules. Thus, FIG. 3 is merely an exemplary illustration of the composition and functionality of the modules in the server 200 and the at least one terminal device 100. Those skilled in the art can make various variations without departing from the teaching of the present disclosure.

The terminal device 100 locally caches a plurality of sample sentences and the response content thereof. The terminal device 100 may comprise, for example, a voice recognition module 102, a semantic matching module 103, a determination module 104, and a first transmission module 105.

The server 200 comprises a second transmission module 201 and a semantic understanding module 202.

The voice recognition module 102 is configured to perform voice recognition on collected voice signals to acquire an input sentence, wherein the input sentence may be an input sentence in the form of a string of characters; it is understood that the terminal device 100 further comprises an internal or external voice signal acquisition module 101 (such as a microphone, etc.) for collecting voice signals.

The semantic matching module 103 is configured to perform semantic matching between the input sentence and a sample sentence to obtain a matching result, which is used to determine whether there is a sample sentence having the same or similar semantics as the input sentence among the cached sample sentences.

The determination module 104 is configured to determine whether there is a sample sentence having the same or similar semantics as the input sentence in the cached sample sentences: if yes, response content, cached by the terminal device 100, corresponding to the sample sentence having the same or similar semantics as the input sentence is used as response content of the input sentence; if not, the input sentence is sent to the server 200 through the first transmission module 105.

The semantic understanding module 202 is configured to perform semantic understanding on the input sentence received by the second transmission module 201 according to a knowledge base stored on the server 200, and acquire response content of the input sentence, and send the response content to the terminal device 100 through the second transmission module 201, wherein the knowledge base is a semantic understanding knowledge base including sample sentences and the response content thereof and various related information, and the knowledge base can be stored in a database of the server 200. The semantic understanding module 202 may perform semantic understanding of the input sentence according to the content included in the knowledge base based on a semantic understanding model generated by training using existing semantic understanding algorithms, so as to acquire the response content of the input sentence. In addition, the server 200 can continuously train and update the semantic understanding model to ensure the accuracy rate and the like of the semantic understanding.

The terminal device 100 is configured to respond to the input sentence according to the response content of the input sentence.

Wherein, the terminal device 100 may be various electronic devices, including but not limited to a personal computer, a smart phone, a smart watch, a tablet computer, a personal digital assistant, a smart player, a vehicle-mounted terminal, an electronic picture screen, etc. The terminal device 100 communicates with the server 200 via a network, and the network may include various connection types, such as wired or wireless communication links, or fiber optic cables, etc. In a specific example, communication is performed between the terminal device 100 and the server 200 through a communication link established between the first transmission module 105 and the second transmission module 201.

The voice interaction system provided in the present embodiment can reduce the processing pressure of the server, reduce the cost of the server and improve the response speed of voice interaction without excessively increasing the requirements for the processing performance and storage space of the terminal device, or in the case where the current terminal device can meet the storage space and processing performance requirements for the terminal device. The system is particularly suitable for situations where a server or a server cluster consisting of a limited number of servers provides voice interaction service for a large number of terminal devices at the same time. In addition, the cache mechanism of the sample sentences and the response content thereof is easy to manage and can be flexibly configured.

In addition, compared with the solution provided in the present embodiment, on one hand, if the knowledge base including sample sentences and the response content thereof and various related information is completely delivered to the terminal device and the terminal device executes the semantic understanding algorithm, although the processing pressure of the server can be reduced and the cost of the server can be reduced, the requirements for the storage space and processing performance of the terminal device are higher, and moreover, the response speed of voice interaction cannot be effectively improved; on the other hand, if semantic matching is only performed on the terminal device, and if the sample sentence with the highest similarity is also used as a similar sample sentence in the case where there is no same or similar sample sentence and the response content of the input sentence is acquired according to the sample sentence with the highest similarity, it is difficult to ensure the accuracy of voice interaction.

In summary, in the voice interaction system provided in the present embodiment, the terminal device caches a plurality of sample sentences and response content thereof (rather than a knowledge base) occupying less storage space; after the input sentence is acquired through voice recognition, semantic matching, that is simple and fast relative to voice understanding, is performed locally on the terminal device to accurately acquire the response content, and if the semantic matching is unsuccessful, the input sentence is sent to the server for voice understanding to accurately acquire the response content. The method is a solution for realizing voice interaction through terminal-cloud cooperation, can give consideration to the aspects of accuracy, efficiency (response speed), implementation cost and the like of voice interaction, and has obvious advantages compared with existing voice interaction solutions.

In some optional implementation manners of the present embodiment, the response content further includes at least one of a control instruction or voice response content. The terminal device 100 further comprises an execution module 106 for executing a corresponding action according to the control instruction and/or a voice broadcast module 107 for carrying out a voice broadcast on the voice response content.

In some optional implementation manners of the present embodiment, the server 200 is a cloud server.

In some optional implementation manners of the present embodiment, the terminal device 100 caches a plurality of word vectors.

The semantic matching module 103 further comprises:

a word segmentation module configured to perform word segmentation on the input sentence and each of sample sentences cached by the terminal device 100;

a word vector acquisition module configured to acquire a word vector of one or more words in the input sentence according to a word segmentation result for the input sentence and word vectors cached by the terminal device 100, and acquires a word vector of one or more words in each sample sentence according to a word segmentation result for each sample sentence and word vectors cached by the terminal device 100.

a sentence vector generation module configured to generate a sentence vector of the input sentence according to the word vector of the one or more words in the input sentence, and generate a sentence vector of each sample sentence according to the word vector of the one or more words in each sample sentence; and a similarity calculation module configured to perform a similarity calculation on the input sentence and each sample sentence according to the sentence vector of the input sentence and the sentence vector of each sample sentence, to acquire a matching result.

By adopting this implementation manner, through the plurality of word vectors cached in the terminal device 100, it is possible to reduce calculation resources consumed in the semantic matching process, save the processing capability of the terminal device 100, and improve the speed of semantic matching, without excessively occupying the storage space of the terminal device.

In some optional implementation manners of the present embodiment, the sentence vector generation module is further configured to encode the word vector of the one or more words in the input sentence and encode the word vector of the one or more words in each sample sentence using a neural network, so as to generate the sentence vector of the input sentence and the sentence vector of each sample sentence.

By adopting this implementation manner, the accuracy of the generated sentence vector of the input sentence and the generated sentence vectors of the sample sentences can be improved without excessively increasing the requirements for the processing performance of the terminal device 100, so that the precision of semantic matching is improved.

In a specific example, the plurality of word vectors cached by the terminal device 100 are cached as follows: the server 200 extracts word vectors of some frequently used words to generate word vector data after performing word vector model training, and then sends at least part of the word vector data to the terminal device 100 for caching according to the cache capacity of the terminal device 100 itself. When the word vector acquisition module finds that a word vector of a certain word in the input sentence does not exist in the cache, it can send a word vector acquisition request carrying information of the word to the server 200, so that the server 200 sends the word vector of the word to the terminal device 100, and the terminal device 100 updates the cached word vectors according to the received word vector of the word.

The word segmentation module can realize word segmentation by using various existing word segmentation tools, and can also realize word segmentation by a word segmentation program programmed based on existing word segmentation algorithms.

The sentence vector generation module performs conversion using a deep learning method in which a simple neural network is used to encode a word vector sequence into a sentence vector. It needs to be noted that the model corresponding to the encoding performed using the neural network should be substantially consistent with the semantic understanding model generated by the server 200 by training, so as to ensure the consistency and accuracy of response content acquisition. In addition, for the terminal device 100 with low processing performance such as a low-end electronic product, the sentence vector generation module can also generate a sentence vector by using a simple method of word vector addition; this method requires low processing performance for processing and has a high processing speed, and in cooperation with setting a higher similarity threshold when performing a similarity calculation, the accuracy of the similarity calculation can also be ensured.

The similarity calculation module can also perform a similarity calculation by using a calculation method based on cosine distance, Euclidean distance, Mahalanobis distance and the like. Taking the cosine distance as an example, the specific formula for calculating a distance between a vector A of the input sentence and a vector B of a sample sentence is as follows:

$$\cos\theta = \frac{\sum_{i=1}^{n}(A_i \times B_i)}{\sqrt{\sum_{i=1}^{n}(A_i)^2} \times \sqrt{\sum_{i=1}^{n}(B_i)^2}}$$

wherein, the value range of similarity value is between 0 and 1, and a similarity threshold can be set. If the similarity value between the input sentence and a certain sample sentence is greater than the similarity threshold, the two sentences are considered to be at least similar (namely same or similar), and then the determination module can determine that there is a sample sentence having the same or similar semantics as the input sentence among the cached sample sentences according to the matching result, so that the response content corresponding to the input sentence can be directly acquired from the cache of the terminal device 100. If there is no sample sentence a similarity value between which and the input sentence is greater than the similarity threshold, the determination module sends the input sentence to the server 200 for semantic understanding through the first transmission module 105.

In some optional implementation manners of the present embodiment, the server 200 is configured to update the knowledge base according to the input sentence received by the second transmission module 201 and the acquired response content of the input sentence.

By adopting this implementation manner, the server 200 can update the knowledge base according to the received input sentence, which is advantageous for the expansion of the content of the knowledge base and the improvement of the response speed of subsequent voice interactions.

In the present embodiment, the manner of updating of the sample sentences and the response content thereof cached by the terminal device 100 may be local update or remote update, and the two update manners of local update and remote update can be used simultaneously, wherein the two update manners of local update and remote update are specifically as follows:

Local Update

In some optional implementation manners of the present embodiment, the terminal device 100 is further configured to: update the cached sample sentences and the response content thereof according to the input sentence and the response content thereof, that is, the input sentence used as a sample sentence and the response content thereof are added to the cache content.

By adopting this implementation manner, the local update of the cache content performed by the terminal device 100 according to the input sentence can be realized, which is beneficial to improve the response speed of subsequent voice interactions in a targeted manner.

In a specific example, if the response content is voice response content and the voice response content is acquired from the server 200, the terminal device 100 caches the input sentence and its voice response content (audio files in formats of mp3, way, and the like), while carrying out a voice broadcast of the voice response content by the voice broadcast module 107.

Further, in some optional implementation manners of the present embodiment, the terminal device 100 is further configured to determine an acquisition frequency of the input sentence, and update the cached sample sentences and the response content thereof according to the input sentence with the acquisition frequency greater than a first preset threshold (an acquisition frequency threshold) and the response content thereof.

Wherein, the acquisition frequency of the input sentence is equal to a collection frequency of voice signals corresponding to the input sentence, which can reflect the popularity of the input sentence, and the terminal device 100 can acquire frequently used sentences by counting and sorting acquisition frequencies of input sentences.

By adopting this implementation manner, it is possible to realize the local update of the cache content performed by the terminal device 100 according to input sentences with high acquisition frequencies, which is more beneficial to improve the response speed of subsequent voice interactions in a targeted manner.

Further, in some optional implementation manners of the present embodiment, the terminal device 100 is further configured to determine a cache capacity when updating the cached sample sentences and the response content thereof according to the input sentence with the acquisition frequency greater than the first preset threshold and the response content thereof, and if the cache capacity is less than a second preset threshold (cache capacity threshold), the cached sample sentences and the response content thereof are updated according to a result of comparison between the acquisition frequency of the input sentence and an acquisition frequency of a cached sample sentence with the minimum acquisition frequency.

Wherein, the terminal device 100 can also cache records of the acquisition frequencies of the input sentence and the sample sentence, and when comparing the acquisition frequency of the input sentence to that of the sample sentence, the acquisition frequencies of the input sentence and the sample sentence can be acquired based on the records.

By adopting this implementation manner, it can be ensured that the cache capacity occupied by the cached sample sentences and the response content thereof is managed and controlled, and it can be ensured that the implementation of voice interaction does not occupy excessive storage space of the terminal device 100.

In a specific example, for example, it is supposed that when the cache capacity is less than the second preset threshold, the number of entries of the cached sample sentences and the response content thereof to be updated needs to be kept unchanged, that is, the cache capacity of the terminal device 100 occupied by the cached sample sentences and the response content thereof to be updated cannot be increased any more in this case. It is determined whether the acquisition frequency of the input sentence is greater than the acquisition frequency of the cached sample sentence with the minimum acquisition frequency: if yes, the cached sample sentence with the minimum acquisition frequency and the response content thereof (also including the record of the acquisition frequency) are deleted, and the input sentence and the response content thereof (also including the record of the acquisition frequency) are added to the cache, so as to realize updating the cache and keeping the number of entries of the cached sample sentences and the response content thereof unchanged; if not, the cache is not updated.

Remote Update

In some optional implementation manners of the present embodiment, the terminal devices 100 are further configured to send update request messages carrying cache capacity information of the terminal devices 100 themselves to the server 200, wherein the terminal devices 100 may be configured to periodically send the update request messages, send the update request messages in response to user operations, or send the update request messages when specific events occur, where the specific event refers to, for example, the start-up of a terminal device 100, etc.

The server 200 is further configured to generate cache update data according to the cache capacity information of the terminal devices 100 themselves carried by the update request messages and acquisition frequencies of respective sample sentences in the knowledge base, and send the cache update data to corresponding terminal devices 100; wherein, the server 200 stores received input sentences as sample sentences in the knowledge base, so the acquisition frequencies of the sample sentences are equal to the acquisition frequencies of the input sentences received by the server 200 and can reflect the popularity thereof; the server 200 may identify frequently used sentences by counting and sorting the receiving frequencies of the received input sentences; in addition, the server 200 can calculate the receiving frequencies of the input sentences according to input sentence records sent by each terminal device or input sentence record sent by a group of terminal devices (e.g. terminal devices 100 of the same type).

The terminal devices 100 are further configured to update the cached sample sentences and the response content thereof according to the cache update data.

wherein, the sample sentences initially cached by the terminal devices 100 and the response content thereof can be cached as follows: the server 200 generates initial cache data according to the cache capacity information of the terminal devices 100 themselves carried by the update request messages and acquisition frequencies of respective sample sentences in the knowledge base, and sends the initial cache data to corresponding terminal devices 100; and the terminal devices 100 initialize the cached sample sentences and the response content thereof according to the initial cache data.

By adopting this implementation manner, it is possible to realize the remote update of the cache content of the terminal devices 100 by the server 200, which facilitates the server 200 to synthesize input sentences acquired by a plurality of terminals to update the cache content of the terminal devices 100, and can improve the response speed of subsequent voice interactions.

In addition to the above implementation manners, in some optional implementation manners of the present embodiment, the server 200 is further configured to send an update inquiry message to the terminal devices 100; wherein, the server 200 can be configured to periodically send the update inquiry message, or send the update inquiry message when detecting a specific event, where the specific event refers to, for example, the start-up of a certain terminal device 100 (when a terminal device 100 is shut down, it is disconnected from the server 200, and when the terminal device 100 re-establishes a connection with the server 200, the server 200 determines that it is started up).

The terminal devices 100 are further configured to send update confirmation messages carrying cache capacity information of the terminal devices 100 themselves to the server 200 according to the update inquiry message; wherein, the terminal devices 100 can be configured to present the update inquiry message after receiving the update inquiry message, and send the update confirmation messages carrying the cache capacity information of the terminal devices 100 themselves to the server 200 in response to user confirmation operations.

The server 200 is further configured to generate cache update data according to the cache capacity information of the terminal devices 100 themselves carried by the update confirmation messages and acquisition frequencies of respective sample sentences in the knowledge base, and send the cache update data to corresponding terminal devices 100.

The terminal devices 100 are further configured to update the cached sample sentences and the response content thereof according to the cache update data.

Figure 4:
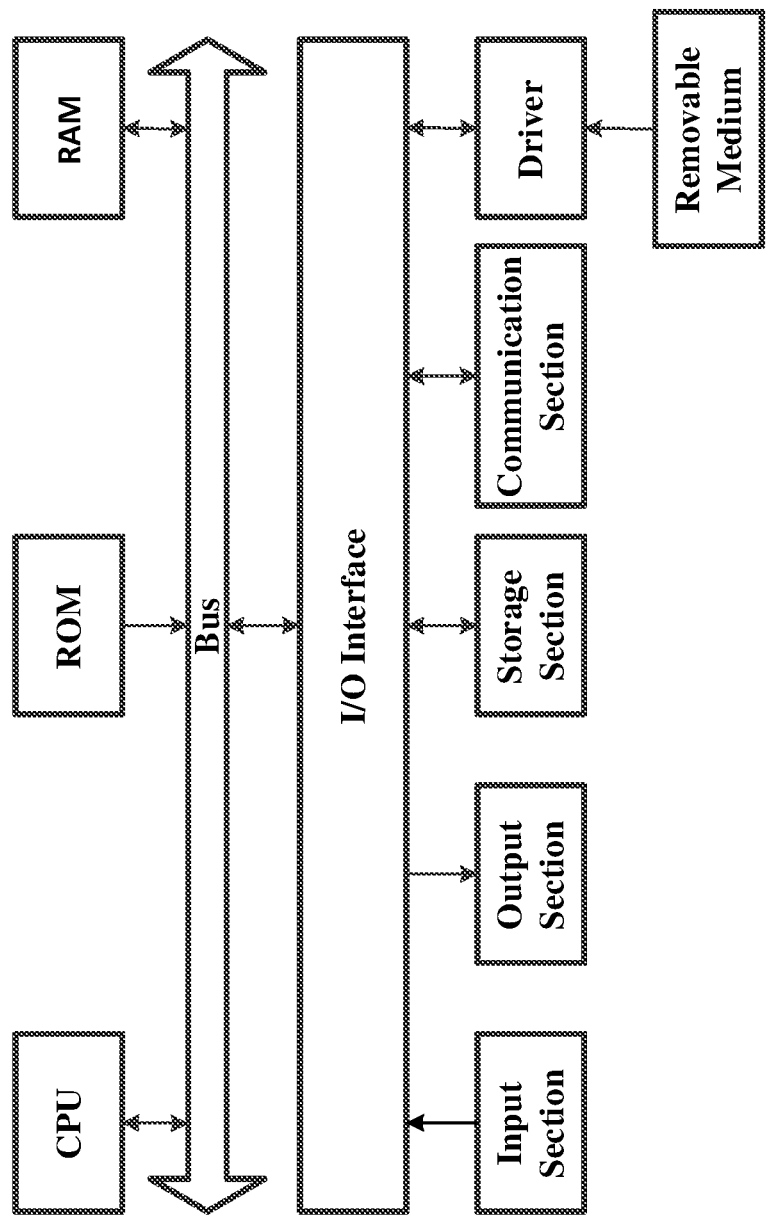
FIG. 4 is a schematic structure diagram illustrating a computer system provided in an embodiment of the present disclosure.

FIG. 4 is a schematic structure diagram illustrating a computer system according to an embodiment of the present disclosure. The computer system can be used for realizing the terminal devices 100 or the server 200 provided by the embodiment of the present disclosure.

As shown in FIG. 4, the computer system may include a central processing module (CPU) that can perform various appropriate actions and processes according to a program stored in a Read Only Memory (ROM) or a program loaded from a storage section into a Random Access Memory (RAM). In the RAM, various programs and data necessary for an operation of the computer system are also stored. The CPU, ROM and RAM are connected to each other via a bus. An input/output (I/O) interface is also connected to the bus.

The following components are connected to the I/O interface: an input section including a keyboard, a mouse, and the like; an output section including a Liquid Crystal Display (LCD), a speaker, and the like; a storage section including a hard disk, and the like; and a communication section including a network interface card such as a LAN card, a modem, or the like. The communication section performs communication processing via a network such as the Internet. A drive is also connected to the I/O interface as needed. A removable medium such as a magnetic disk, an optical disk, a magneto-optical disk, a semiconductor memory, or the like is mounted on the drive as needed, so that a computer program read out therefrom is mounted into the storage section as needed.

In particular, the process described by the flowcharts hereinabove may be implemented as a computer software program according to the present embodiment. For example, the present embodiment includes a computer program product comprising a computer program tangibly embodied on a computer readable medium, the computer program comprising program codes for performing the method illustrated in the flowchart. In such an embodiment, the computer program may be downloaded and installed from a network via the communication section, and/or installed from a removable medium.

The flowcharts and schematic diagrams in the figures illustrate the architecture, functionality, and operation of possible implementations of the system, method and computer program product according to the present embodiment. In this regard, each block in the flowcharts or schematic diagrams may represent a module, program segment, or portion of codes, which comprises one or more executable instructions for implementing specified logical function(s). It should also be noted that, in some alternative implementations, the functions noted in the blocks may occur in an order different from that noted in the figures. For example, two blocks shown in succession may, in fact, be executed substantially concurrently, or they may sometimes be executed in a reverse order, depending upon the function involved. It will also be noted that each block of the schematic diagrams and/or flowcharts, and combinations of blocks in the schematic diagrams and/or flowcharts, can be implemented by a special purpose hardware-based system which performs specified functions or operations, or implemented by a combination of special purpose hardware and computer instructions.

The modules described in the present embodiment may be implemented by software or hardware. The described modules may also be provided in a processor, for example, it may be described as: a processor, comprising a voice recognition module, a semantic matching module and a determination module. Wherein, the names of these modules do not in some cases constitute a limitation on the modules themselves. For example, the semantic matching module can also be described as "a semantic comparison module".

As another aspect, the present embodiment also provides a non-volatile computer storage medium, which may be a non-volatile computer storage medium included in an apparatus in the above embodiment, or may be a non-volatile computer storage medium that exists separately and is not installed in a terminal. The above non-volatile computer storage medium stores one or more programs that, when executed by a device, cause the device to: perform voice recognition on collected voice signals to acquire an input sentence; perform semantic matching between the input sentence and a cached sample sentence to obtain a matching result; determine whether the matching result indicates there is a sample sentence having the same or similar sentences as the input sentence: if yes, cached response content corresponding to the sample sentence having the same or similar semantics as the input sentence is used as response content of the input sentence; if no, the input sentence is sent to a server so that the server performs semantic understanding of the input sentence according to a knowledge base stored on the server, acquires response content of the input sentence and returns the response content; and respond to the input sentence according to the response content.

The technical solution of the present disclosure can dramatically reduce the processing pressure of the server, reduce the cost of the server and improve the response speed of voice interaction without excessively increasing the requirements for the processing performance and storage space of the terminal device, and is particularly suitable for situations where a server or a server cluster consisting of a limited number of servers provides voice interaction service for a large number of terminal devices at the same time.

It is to be noted that terms used in the present disclosure to describe relations such as a first and a second are only used to distinguish one entity or operation from another, but shall not require or suggest that these entities or operations have such an actual relation or sequence. Furthermore, the term "comprising", "including" or any other variable intends to cover other nonexclusive containing relations to ensure that a process, method, article or apparatus comprising a series of factors comprises not only those factors but also other factors not explicitly listed, or further comprises factors innate to the process, method, article or apparatus. Without more limitations, a factor defined with the sentence "comprising one" does not exclude the case that the process, method, article or apparatus comprising said factor still comprises other identical factors.

Obviously, the above examples of the present disclosure are provided only to clearly illustrate the present disclosure, but shall by no means limit the embodiment of the present disclosure. Those skilled in the art may make modifications or changes in any different form on the basis of the above illustration. Not all embodiments can be exemplified here, and any obvious change or modification based on the technical solution of the present disclosure still falls into the scope of protection sought for in the present disclosure.

What is claimed is:

1. A method performed by a terminal device, comprising:
    performing voice recognition on collected voice signals to acquire an input sentence;
    performing semantic matching between the input sentence and cached sample sentences to determine whether there is a sample sentence having the same or similar semantics as the input sentence among the cached sample sentences;
    in response to determining that there is a sample sentence having the same or similar semantics as the input sentence among the cached sample sentences, acquiring cached response content corresponding to the sample sentence having the same or similar semantics as the input sentence as first response content of the input sentence;
    in response to determining that there is no sample sentence having the same or similar semantics as the input sentence among the cached sample sentences, sending the input sentence to a server, and receiving transmitted response content of the input sentence from the server as the first response content of the input sentence, wherein the transmitted response content of the input sentence from the server is acquired by the server through semantic understanding of the input sentence according to a knowledge base stored on the server; and responding to the input sentence according to the first response content of the input sentence, wherein the method further comprises:

sending an update request message carrying cache capacity information of the terminal device itself to the server;

receiving cache update data from the server, wherein the cache update data is generated by the server at least according to the cache capacity information of the terminal device itself carried by the update request message and acquisition frequencies of respective sample sentences in the knowledge base; and updating the cached sample sentences and cached response content of the cached sample sentences according to the cache update data.

2. The method according to claim 1, further comprising: updating the cached sample sentences and the response content of the cached sample sentences according to the input sentence and the first response content of the input sentence.

3. The method according to claim 2, wherein the updating the cached sample sentences and the response content of the cached sample sentences according to the input sentence and the first response content of the input sentence further comprises:

determining an acquisition frequency of the input sentence;

comparing the acquisition frequency of the input sentence to a first preset threshold; and in response to determining that the acquisition frequency of the input sentence is greater than the first preset threshold, updating the cached sample sentences and the response content of the cached sample sentences according to the input sentence and the first response content of the input sentence.

4. The method according to claim 3, wherein, the updating the cached sample sentences and the response content of the cached sample sentences according to the input sentence and the first response content of the input sentence in response to determining that the acquisition frequency of the input sentence is greater than the first preset threshold further comprises:

comparing a cache capacity of the terminal device to a second preset threshold;

in response to determining that a cache capacity of the terminal device is less than the second preset threshold, comparing the acquisition frequency of the input sentence to an acquisition frequency of a cached sample sentence with a minimum acquisition frequency; and in response to determining that the acquisition frequency of the input sentence is greater than the acquisition frequency of the cached sample sentence with the minimum acquisition frequency, updating the cached sample sentences and the response content of the cached sample sentences by using the input sentence and the first response content of the input sentence to replace the cached sample sentence with the minimum acquisition frequency.

5. The method according to claim 1, wherein performing semantic matching between the input sentence and the cached sample sentences to determine whether there is a sample sentence having the same or similar semantics as the input sentence among the cached sample sentences further comprises:

performing word segmentation on the input sentence and each sample sentence of the cached sample sentences, respectively;

acquiring a word vector of one or more words in the input sentence according to a word segmentation result for the input sentence and cached word vectors, and for each sample sentence of the cached sample sentences, acquiring a word vector of one or more words in the sample sentence according to a word segmentation result for the sample sentence and the cached word vectors;

generating a sentence vector of the input sentence according to the word vector of the one or more words in the input sentence, and for each sample sentence of the cached sample sentences, generating a sentence vector of the sample sentence according to the word vector of the one or more words in the sample sentence;

for each sample sentence of the cached sample sentences, performing a similarity calculation on the input sentence and the sample sentence according to the sentence vector of the input sentence and the sentence vector of the sample sentence; and determining whether there is a sample sentence having the same or similar semantics as the input sentence among the cached sample sentences based on a result of a similarity calculation.

6. The method according claim 5, wherein the generating a sentence vector of the input sentence according to the word vector of the one or more words in the input sentence, and for each sample sentence of the cached sample sentences, generating a sentence vector of the sample sentence according to the word vector of the one or more words in the sample sentence further comprises:

encoding, using a neural network, the word vector of the one or more words in the input sentence, so as to generate the sentence vector of the input sentence; and for each sample sentence of the cached sample sentences, encoding the word vector of the one or more words in the sample sentence using a neural network, so as to generate the sentence vector of the sample sentence.

7. The method according to claim 1, wherein:

the first response content of the input sentence further comprises at least one of a control instruction or voice response content; and the responding to the input sentence according to the first response content of the input sentence includes at least one of: performing a corresponding action according to the control instruction, or carrying out a voice broadcast on the voice response content.

8. A terminal device, comprising:

a memory, storing computer instructions thereon; and a processor coupled to the memory, wherein when the processor executes the computer instructions, the processor is configured to:

perform voice recognition on collected voice signals to acquire an input sentence; performing semantic matching between the input sentence and cached sample sentences to determine whether there is a sample sentence having the same or similar semantics as the input sentence among the cached sample sentences;

in response to determining that there is a sample sentence having the same or similar semantics as the input sentence among the cached sample sentences, acquire cached response content corresponding to the sample sentence having the same or similar semantics as the input sentence as first response content of the input sentence;

in response to determining that there is no sample sentence having the same or similar semantics as the input sentence among the cached sample sentences, send the input sentence to a server, and receive transmitted response content of the input sentence from the server as the first response content of the input sentence, wherein the transmitted response content of the input sentence from the server is acquired by the server through semantic understanding of the input sentence according to a knowledge base stored on the server; and respond to the input sentence according to the first response content of the input sentence, wherein when the processor executes the computer instructions, the processor is further configured to:

send an update request message carrying cache capacity information of the terminal device itself to the server;

receive cache update data from the server, wherein the cache update data is generated by the server at least according to the cache capacity information of the terminal device itself carried by the update request message and acquisition frequencies of respective sample sentences in the knowledge base; and update the cached sample sentences and cached response content of the cached sample sentences according to the cache update data.

9. The terminal device according to claim 8, wherein when the processor executes the computer instructions, the processor is further configured to:

update the cached sample sentences and the response content of the cached sample sentences according to the input sentence and the first response content of the input sentence.

10. The terminal device according to claim 9, wherein when the processor executes the computer instructions, the processor is further configured to update the cached sample sentences and the response content of the cached sample sentences according to the input sentence and the first response content of the input sentence by performing the following operations:

determining an acquisition frequency of the input sentence;

comparing the acquisition frequency of the input sentence to a first preset threshold; and in response to determining that the acquisition frequency of the input sentence is greater than the first preset threshold, updating the cached sample sentences and the response content of the cached sample sentences using the input sentence and the first response content of the input sentence.

11. The terminal device according to claim 10, wherein, when the processor executes the computer instructions, the processor is further configured to update the cached sample sentences and the response content of the cached sample sentences according to the input sentence and the first response content of the input sentence in response to determining that the acquisition frequency of the input sentence is greater than the first preset threshold by performing the following operations:

comparing a cache capacity of the terminal device to a second preset threshold;

in response to determining that a cache capacity of the terminal device being less than the second preset threshold, comparing the acquisition frequency of the input sentence to an acquisition frequency of a cached sample sentence with a minimum acquisition frequency; and in response to determining that the acquisition frequency of the input sentence is greater than the acquisition frequency of the cached sample sentence with the minimum acquisition frequency, updating the cached sample sentences and the response content of the cached sample sentences by using the input sentence and the first response content of the input sentence to replace the cached sample sentence with the minimum acquisition frequency.

12. The terminal device according to claim 8, wherein, when the processor executes the computer instructions, the processor is further configured to perform the semantic matching between the input sentence and the cached sample sentences to determine whether there is a sample sentence having the same or similar semantics as the input sentence among the cached sample sentences by performing the following operations:

performing word segmentation on the input sentence and each sample sentence of the cached sample sentences, respectively;

acquiring a word vector of one or more words in the input sentence according to a word segmentation result for the input sentence and cached word vectors, and for each sample sentence of the cached sample sentences, acquiring a word vector of one or more words in the sample sentence according to a word segmentation result for the sample sentence and the cached word vectors;

generating a sentence vector of the input sentence according to the word vector of the one or more words in the input sentence, and for each sample sentence of the cached sample sentences, generating a sentence vector of the sample sentence according to the word vector of the one or more words in the sample sentence;

for each sample sentence of the cached sample sentences, performing a similarity calculation on the input sentence and the sample sentence according to the sentence vector of the input sentence and the sentence vector of the sample sentence; and determining whether there is a sample sentence having the same or similar semantics as the input sentence among the cached sample sentences based on a result of a similarity calculation.

13. The terminal device according to claim 12, wherein, when the processor executes the computer instructions, the processor is further configured to generate a sentence vector of the input sentence according to the word vector of the one or more words in the input sentence, and for each sample sentence of the cached sample sentences, generate a sentence vector of the sample sentence according to the word vector of the one or more words in the sample sentence by performing the following operations:

encoding, using a neural network, the word vector of the one or more words in the input sentence, so as to generate the sentence vector of the input sentence; and for each sample sentence of the cached sample sentences, encoding the word vector of the one or more words in the sample sentence using a neural network, so as to generate the sentence vector of the sample sentence.

14. The terminal device according to claim 8, wherein:
the first response content of the input sentence further comprises at least one of a control instruction or voice response content; and
when the processor executes the computer instructions, the processor is further configured to respond to the input sentence according to the first response content of the input sentence by at least one of the following: performing a corresponding action according to the control instruction, or carrying out a voice broadcast on the voice response content.

15. A voice interaction system, comprising:
a terminal device configured to:
perform voice recognition on collected voice signals to acquire an input sentence, perform semantic matching between the input sentence and cached sample sentences to determine whether there is a sample sentence having the same or similar semantics as the input sentence among the cached sample sentences,
in response to determining that there is a sample sentence having the same or similar semantics as the input sentence among the cached sample sentences, acquire cached response content corresponding to the sample sentence having the same or similar semantics as the input sentence as first response content of the input sentence,
in response to determining that there is no sample sentence having the same or similar semantics as the input sentence among the cached sample sentences, send the input sentence to a server, and receive transmitted response content of the input sentence from the server as the first response content of the input sentence, and
respond to the input sentence according to the first response content of the input sentence; and
the server, wherein the server is configured to:
receive the input sentence from the terminal device,
perform semantic understanding of the input sentence according to a knowledge base stored on the server to acquire the transmitted response content of the input sentence, and
send the transmitted response content of the input sentence to the terminal device,
wherein the terminal device is further configured to:
send an update request message carrying cache capacity information of the terminal device itself to the server,
receive cache update data from the server, and
update the cached sample sentences and response content of the cached sample sentences according to the cache update data; and
the server is further configured to:
receive the update request message from the terminal device,
generate the cache update data at least according to cache capacity information of the terminal device itself carried by the update request message and acquisition frequencies of respective sample sentences in the knowledge base, and
send the cache update data to the terminal device.

16. The voice interaction system according to claim 15, wherein:
the server is further configured to:
update the knowledge base according to the received input sentence and the transmitted response content of the input sentence.

17. A non-transitory computer-readable storage medium having stored thereon a computer program, wherein the program, when executed by a processor, implements the method according to claim 1.

* * * * *